April 22, 1958 R. A. MAHLMEISTER 2,831,263
GAUGING DEVICE
Filed Sept. 21, 1954
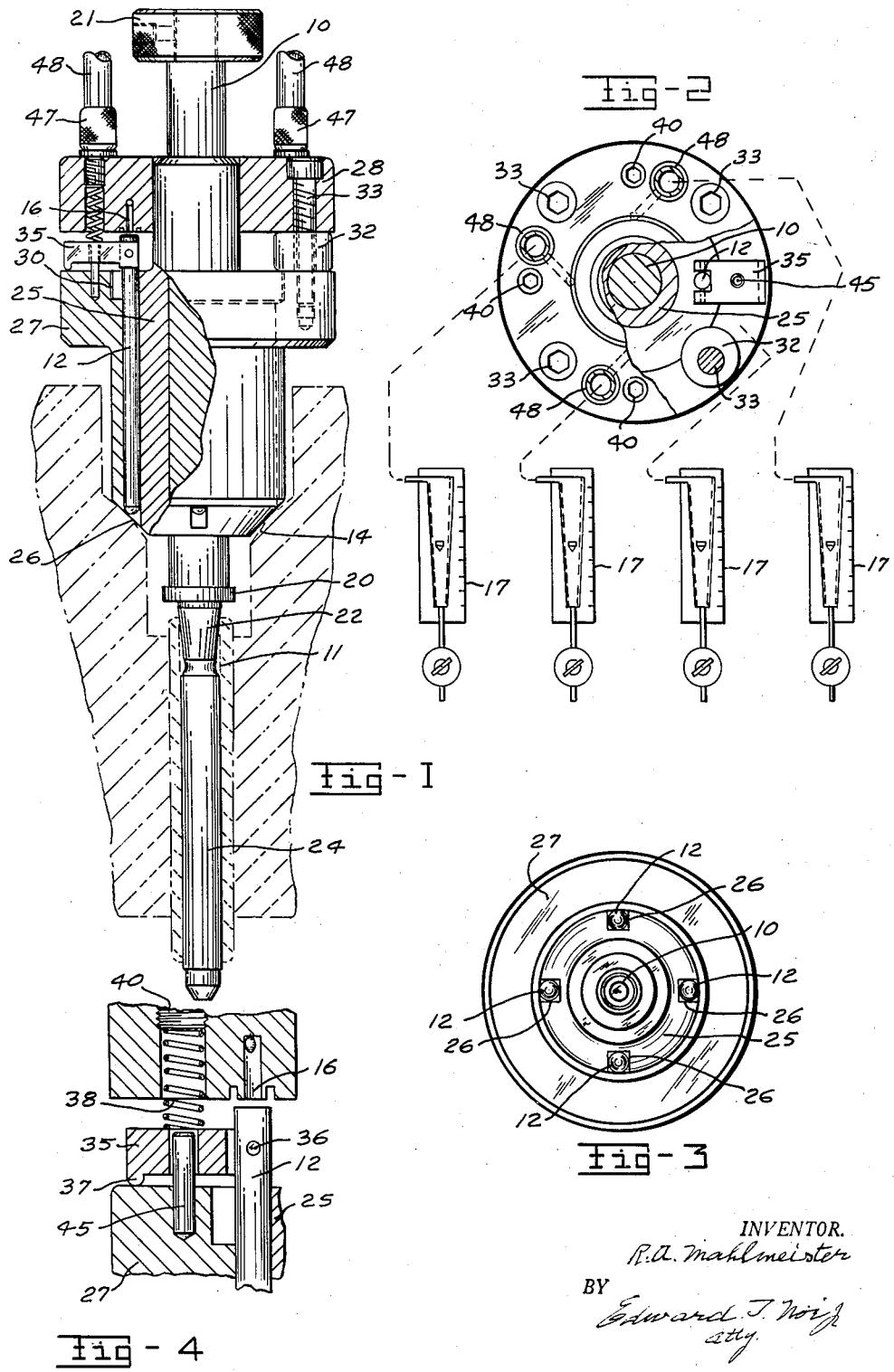
INVENTOR.
R. A. Mahlmeister
BY Edward J. Noiy
atty.

United States Patent Office 2,831,263
Patented Apr. 22, 1958

2,831,263

GAUGING DEVICE

Raymond A. Mahlmeister, Dayton, Ohio, assignor, by mesne assignments, to The Sheffield Corporation, a corporation of Delaware Application September 21, 1954, Serial No. 457,519

8 Claims. (Cl. 33—181)

This invention relates to a gauging apparatus and more particularly to an apparatus for gauging the relative concentricity between two substantially aligned surfaces of an article.

It is an object of this invention to provide a gauging apparatus for gauging the relative concentricity between two substantially aligned surfaces of an article such as a valve seat and valve guide hole in an internal combustion engine, the apparatus comprising guide means for locating insertion into one of the surfaces and movable gauging contacts equally spaced at equal radii about the axis of the guide for engagement with the second of the article surfaces and further providing separate gauging means controlled by each of the contacts whereby a comparison of the responses of the gauging means will indicate the relative concentricity between the surfaces gauged.

It is a further object to provide such an apparatus which is ruggedly conformed of a few simple components and which includes an elongated pilot guide member and a body portion slidable along and rotatable about the axis of the guide member, the body portion carrying the gauging contacts and the gauging means associated therewith.

It is a further object to provide such an apparatus wherein the gauging contacts are slidably carried in the apparatus body and are operative to control fluid leakage through orifices provided for each of the contacts, each of the leakage orifices being separately connected to an air gauge and a source of fluid under pressure.

It is a further object of this invention to provide such an apparatus wherein the body portion comprises two principal components one of which slidably carries the gauging contacts and the other of which carries the leakage orifices operatively associated with the inner ends of the gauging contacts, means being provided for adjustably varying the spacing between the body portions whereby the spacing between the leakage orifices and the associated ends of the gauging contacts can be effectively varied as desired to compensate for wear and the like.

It is a further object to provide such an apparatus wherein each of the gauging contacts is elongated and is carried for sliding movement along its axis and wherein each gauging contact is linked to a pivotally mounted member fulcrumed at a point displaced from its linkage to the gauging contact and engaged by spring means, thus serving to urge the contact into engagement with an article surface and limit the outward movement thereof.

Other objects and advantages of the invention will be apparent from the following description, the appended claims, and the accompanying drawing in which a preferred embodiment of the invention has been shown.

In the drawing:

Figure 1 illustrates, in partial section, a gauging apparatus embodying the present invention as applied to gauging the relative concentricity between a valve guide hole and a valve seat of an internal combustion engine, the valve seat and associated structure being shown in phantom section.

Figure 2 is a view of the upper end of the apparatus of Figure 1 and shows diagrammatically the connections from the gauging apparatus to the indicating instruments, Figure 3 is a view of the lower end of the ilustrated apparatus, and Figure 4 is an enlarged fragment of the sectional view of Figure 1 illustrating in detail the association of a gauging plunger with the orifice which it controls and the structure by which the plunger is urged outward into engagement with the valve seat, is retained in the apparatus and is restricted from rotation.

An exemplary apparatus has been illustrated for the purpose of disclosing the features of this invention as applied to gauging the concentricity between a valve seat and a valve guide hole. It will be understood however that the present invention is not limited to the specific features of the apparatus disclosed nor is it limited to use in the illustrative application.

The illustrated apparatus comprises a central pilot or guide member 10 which is inserted into a valve guide hole 11 and locates the apparatus concentrically therewith. The apparatus body is located by the guide member 10 and is slidable along the length thereof. Elongated gauging contacts 12 are slidably guided within the apparatus body and are urged into engagement with the valve seat 14 at four points equally spaced at equal radii about the axis of the guide member 10. These gauging contacts 12 will be accordingly relatively positioned in accordance with the relative concentricity between the valve guide hole 11 and the valve seat 14. A fluid leakage orifice, one of which is indicated at 16 in Figures 1 and 4, is operatively associated with the inner end of each of the contacts 12 and the fluid leakage therethrough is controlled by the associated contact. Each of the leakage orifices is connected to an indicating means such as those indicated at 17 in Figure 2. The indicating means employed can be of any suitable type responsive to the leakage of the associated orifice. As shown diagrammatically the indicators 17 are of the type wherein a float positions itself vertically along an internal tapered transparent flow tube in accordance with the velocity of flow upward therethrough.

It will be seen that a comparison of the indications of the instruments 17 will indicate the relative concentricity between the valve seat 14 and the valve guide hole 11. By rotating the apparatus body about the axis of the pilot guide 10, a complete study of both the concentricity and the configuration of the valve seat itself can be made. For example, if the valve seat 14 has a depression along its surface, as each of the gauging contacts 12 passes over the depression the associated indicating instrument 17 will respond indicating such a condition. A comparison of instrument indications will indicate not only eccentricity between the valve seat and the valve guide hole but the instruments will also be responsive to a tilt of the valve seat. The apparatus will thus indicate those conditions which will cause improper valve seating and inefficient engine operation.

The guide member 10 has an upper cylindrical portion along which the apparatus body can slide and rotate and this upper portion terminates at a flange 20 which cooperates with a knurled nut 21 to restrict the sliding movement of the apparatus body. It will be noted that the lower portion of the guide member 10 which is inserted within the valve guide hole 11 comprises an upper tapered portion 22 and an elongated lower cylindrical portion 24. This configuration is provided to insure that the guide member is accurately aligned with the valve guide hole 11 irrespective of the manufacturing tolerances within which the internal diameter of the valve guide hole may vary. The tapered portion 22 will engage the upper section of the valve guide hole 11 irrespective of its variance and due to the elongated lower portion 24 the distance through which any rocking movement can take place is minimized and accurate alignment is insured.

The central member of the apparatus body is a carrier 25 which has a close sliding fit along the guide member 10. This carrier 25 has, in the illustrated embodiment, four longitudinal grooves in its outer surface as indicated at 26. One of the cylindrical plungers 12 is carried for axial sliding in each of these grooves 26 and the grooves 26 are arranged to guide the plungers 12 along axes which are parallel to the axis of guide member 10 and which are equally relatively spaced at equal radii thereabout. The grooves 26 are closed and the lower portion of the apparatus body is completed by an outer sleeve member 27. It will be noted that there is a conical chamfer across the lower faces of both the sleeve 27 and carrier 25 which is substantially parallel to the valve seat 14. The gauging plungers 12 are urged through this annular conical surface and into engagement with the valve seat 14 by structure later described.

Fluid leakage orifices, one of which is indicated at 16 in Figures 1 and 4, are provided in a top plate 28. One of the orifices is situated in opposed relationship to the inner end of each of the gauging plungers 12 and the leakage through the orifice is controlled by the plunger movements and the dimensional characteristics of the part gauged. This top plate 28 forms the upper portion of the apparatus body and is held in spaced relationship to the sleeve 27 and a flange 30 on carrier 25 by spacers 32 interposed therebetween. In the illustrated embodiment there are four such spacers equally spaced about the axis of the apparatus. The spacers 32 are held in position by bolts threaded into a flange on sleeve 27 and which have their heads seated in counterbores in top plate 28. It will be apparent that by varying the thickness of the spacers 32 the normal clearance between the inner ends of the gauging plungers 12 and the orifice outlets 16 can be varied to compensate for wear and the like.

A pivot member or clevis 35 is pivotally linked by means of a pin 36 to the inner end of each of elongated gauging plungers 12. Each of the clevises 35 extend substantially radial of the apparatus body from the associated plungers 12 and has a fulcrum extension as indicated at 37 which engages sleeve 27 and about which the clevis pivots. Intermediate its ends each clevis 35 is engaged by a spring 38 which serves to pivot the clevis in a clockwise direction as seen in Figure 4 and to urge the gauging plunger into engagement with the valve seat. The compression exerted by spring 38 is adjustable by means of a screw 40 threaded into the plate 28. When cylindrical gauging plungers are utilized as illustrated, a pin 45 is fitted into the sleeve 27 and extends upward, with clearance to allow pivoting, into the clevis 35 to prevent rotation of the clevis and the associated gauging plunger.

Each of the orifices 16 communicates through passages in plate 28 to a connection as indicated at 47 and a flexible tube as indicated at 48 leading to one of the indicators 17. Thus the indicators can be positioned in a stationary position for ready observance by the operator.

While any suitable measuring instrument responsive to the leakage flow to the orifices can be employed, in the illustrated embodiments these readings are obtained on flow measuring apparatuses of the general character, for example, as disclosed in U. S. Patent No. 2,254,259, granted September 2, 1941. Such instruments provide an adjustment for adjusting the position of the indicating float along the length of the internal transparent flow tube and for varying the instrument amplification. With the gauging apparatus of this invention situated for gauging surfaces of nominal relationship the indicating floats can be relatively positioned in a horizontal straight line. Any deivation of one surface with respect to the other in subsequent gauging will then be readily apparent to the operator. A complete study of the relative concentricity of the valve seat and valve guide hole in the illustrated example can be made by comparison of the instrument readings.

Thus it is seen that a gauging apparatus has been provided for measuring the relative alignment of a hole in an article with respect to another surface of the article in an efficient and precise manner. The apparatus is simply constructed of a few ruggedly conformed components and will have a long service life in repeated gauging operations.

While the form of apparatus herein described constitutes a preferred embodiment of the invention, it is to be understood that the invention is not limited to this precise form of apparaus and that changes may be made therein without departing from the scope of the invention which is defined in the appended claims.

What is claimed is:

1. An apparatus for gauging the relative disposition between a pair of substantially aligned annular surfaces of an article, said apparatus comprising an elongated guide member having a pilot portion at one end thereof for locating insertion into a first of the annular surfaces of the article including a tapered portion for snugly engaging one end of said first surface, an apparatus body carried for rotation about and axial sliding along the other portion of said guide member, said apparatus body comprising a first portion having locating means at the end thereof adjacent the pilot portion of the guide member for engagement with the second of said article surfaces in gauging, a plurality of elongated gauging plungers slidably carried in said first body portion generally along the axis of said guide member equally spaced apart at equal radii relative thereto, said plungers having work contacting portions at one end thereof for engagement with the second of said article surfaces, means operatively connected to each gauging plunger adjacent its inner end urging the plungers through said annular body surface and into engagement with the second article surface, a second body portion providing a planar surface perpendicular to the axis of said guide member adjacent the inner ends of the gauging plungers and providing a plurality of air leakage orifices one in opposed relationship with the inner end of each of the plungers, and means cooperating between the first and second body portions to determine the relative spacing therebetween and the normal spacing of each orifice relative to the inner end of the associated gauging plunger, and means for connecting each of said leakage orifices to a source of air under pressure and a separate air gauge.

2. An apparatus for gauging the relative disposition between a pair of substantially aligned annular surfaces of an article, said apparatus comprising an elongated gauging member including a pilot guide portion at one end thereof, an apparatus body carried by said guide member and located thereby, a plurality of elongated gauging plungers carried in said apparatus body for axial sliding movement parallel to the axis of said guide member, said plungers being disposed at equal radii relative to the axis of said guide member and equally relatively spaced apart thereabout, said apparatus body having locating means for engagement with the second of the article surfaces in gauging, each of said plungers having a work contacting portion at one end thereof for extension through said apparatus body surface and into engagement with the second of the article surfaces, a pivot member for each of said plungers carried in said apparatus body, each of said pivot members being pivoted to the associated plunger about an axis at a right angle to the axis of the plunger and extending substantially radially therefrom, a fulcrum contact at the outer end of each of the pivot members for engagement with a surface of the apparatus body, resilient means engagaing each of the pivot members at a point along its length and at a point between the respective gauging plunger and the pivot member fulcrum point thus urging the pivot member in one direction about its fulcrum point and the associated gauging plunger into engagement with the article surface being gauged, a separate gauging means for each of said plungers carried by said apparatus body and responsive to the plunger movement, and a corresponding plurality of indicating means, one operatively connected to each of said gauging means, whereby through a comparison of the indications obtained in gauging an indication of the relative disposition and characteristics of the hole and the article surface are obtained.

3. An apparatus for gauging the relative disposition between a pair of substantialy aligned annular surfaces of an article, said apparatus comprising an elongated gauging member including a pilot guide portion at one end thereof, an apparatus body carried by said guide member and located thereby, a plurality of elongated gauging plungers carried in said apparatus body for axial sliding movement parallel to the axis of said guide member, said plungers being disposed at equal radii relative to the axis of said guide member and equally relatively spaced apart thereabout, said apparatus body having means for engagement with the second of the article surfaces in gauging, each of said plungers having a work contacting portion at one end thereof for extension through said apparatus body surface and into engagement with the second of the article surfaces, a pivot member for each of said plungers carried in said apparatus body, each of said pivot members being pivoted to the associated plunger about an axis at a right angle to the axis of the plunger and extending substantially radially therefrom, a fulcrum contact at the outer end of each of the pivot members for engagement with a surface of the apparatus body, resilient means engaging each of the pivot members at a point along its length and at a point between the respective gauging plunger and the pivot member fulcrum point thus urging the pivot member in one direction about its fulcrum point and the associated gauging plunger into engagement with the article surface being gauged, a separate open leakage orifice in said appaartus in opposed relationship to the inner end of each of said gauging plungers and controlled thereby, and means connected to each of said gauging orifices and adapted for connection to a source of fluid under pressure and a separate gauge.

4. An apparatus for gauging the relative disposition between a pair of substantially aligned annular surfaces of an article, said apparatus comprising an elongated guide member including a pilot guide portion at one end thereof, an apparatus body carried for sliding movement along the other portion of said guide member and for rotation about the axis thereof, a plurality of elongated cylindrical gauging plungers carried in said apparatus body for axial sliding movement parallel to the axis of said guide member, said plungers being disposed at equal radii relative to the axis of said guide member and equally relatively spaced thereabout, said apparatus body having an annular surface at the end thereof adjacent the guide portion of the guide member for association with the second of the article surfaces, each of said plungers having a work contacting portion at one end thereof for extension through said annular surface of the apparatus body, a pivot member for each of said plungers carried in said apparatus body, each of said pivot members being pivoted to the associated plunger about an axis at a right angle to the axis of the plunger and extending substantially radially therefrom, a fulcrum extension at the outer end of each of the pivot members for engagement with a surface of the apparatus body, each of the fulcrum contacts extending generally toward the pilot guide portion of the guide member, a spring for each of the pivot members engaging the respective pivot member at a point between its link to the gauging plunger and its fulcrum point and at the side of the member remote from the fulcrum point, thus urging the member in one direction about its fulcrum point and the associated gauging plunger out of the apparatus and into engagement with the article surface being gauged, a locating pin extending from said apparatus body and into said locating member at a point between its fulcrum point and pivot point to prevent its rotation and prevent rotation of the associated plunger, a separate open leakage orifice in said apparatus in opposed relationship to the inner end of each of said gauging plungers and controlled thereby, and means connected to each of said leakage orifices and adapted for connection to a source of fluid under pressure and a separate gauge.

5. An apparatus for gauging the relative concentricity between a valve guide hole and the associated valve seat of an internal combustion engine or the like, comprising an elongated guide member having an extended lower portion for close interfitting insertion into the valve guide hole and a tapered surface above said lower portion for locating engagement with the upper end of the guide hole to precisely align the axis of said member with said hole while also locating the member endwise relative thereto, said guide member having an upper portion of a length to project above said valve seat during gauging, said upper portion providing a bearing surface coaxial with the axis of said member, a body coaxially journaled on said bearing surface for free rotation relative thereto and free sliding movement therealong coaxially with the guide hole during gauging, locating means on said body for engagement with the valve seat to position said body along said member during gaging, a plurality of air leakage gauging means carried by said body at equal radii from the axis of the guide member and equally spaced thereabout for association with the valve seat when the body is so positioned, each of said gauging means including a movable gauging contact for engaging the valve seat and a leakage orifice controlled thereby, air leakage indicating means, and passage means connecting each of said orifices to said indicating means and a source of air under controlled pressure.

6. An apparatus for gauging the relative concentricity between a valve guide hole and the associated valve seat of an internal combustion engine or the like, comprising an elongated guide member having an extended lower portion for close interfitting insertion into the valve guide hole and a tapered surface above said lower portion for locating engagement with the upper end of the guide hole to precisely align the axis of said member with said hole while also locating the member endwise relative thereto, said guide member having an upper portion of a length to project above said valve seat during gauging, said upper portion providing a bearing surface coaxial with the axis of said member, an apparatus body coaxially journaled on said bearing surface for free rotation and free sliding movement therealong coaxially with the guide hole during gauging, said body having an annular downwardly facing locating surface adjacent its lower end concentric with the axis of the guide member and of a diameter commensurate with that of the valve seat for engagement therewith to position the body along the member during gauging, a plurality of air leakage gauging means carried by said body at equal radii from the axis of the guide member and equally spaced thereabout for association with the valve seat when the body is so positioned, each of said gauging means including a movable gauging contact for engaging the valve seat and a leakage orifice controlled thereby, air leakage indicating means, and passage means connecting each of said orifices to said indicating means and a source of air under controlled pressure.

7. An apparatus as set forth in claim 6 wherein said gauging contacts are elongated and carried in said body for sliding movement parallel to the axis of said guide member for positioning engagement with the valve seat.

8. An apparatus as set forth in claim 7 wherein said body includes upper and lower components respectively carrying said orifices and said gauging contacts, and spacing means between said components for adjusting the spacing between the components and between each orifice and respective contact.

References Cited in the file of this patent

UNITED STATES PATENTS

| | | |
|---|---|---|
| 1,996,092 | Albertson | Apr. 2, 1935 |
| 2,190,306 | Balsiger | Feb. 13, 1940 |
| 2,259,472 | Johnson | Oct. 21, 1941 |
| 2,421,484 | Diamond | June 3, 1947 |
| 2,553,129 | Burnett | May 15, 1951 |
| 2,571,917 | Mennesson | Oct. 16, 1951 |
| 2,622,331 | Haines | Dec. 23, 1952 |
| 2,739,389 | Carter | Mar. 27, 1956 |

FOREIGN PATENTS

| | | |
|---|---|---|
| 341,365 | Great Britain | Jan. 15, 1931 |